(12) United States Patent
Vallart et al.

(10) Patent No.: US 9,409,655 B1
(45) Date of Patent: Aug. 9, 2016

(54) FLIGHT INSTRUMENT DISPLAYING A VARIABLE ROTATIONAL SPEED OF A MAIN ROTOR OF AN AIRCRAFT

(71) Applicant: AIRBUS HELICOPTERS, Marignane (FR)

(72) Inventors: Jean-Baptiste Vallart, Marseilles (FR); Patrick Hellio, Bouc Bel Air (FR); Patricia Gauthier, Les Milles (FR); Setareh Taheri, Marseilles (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/607,162

(22) Filed: Jan. 28, 2015

(51) Int. Cl.
*B64D 45/00* (2006.01)
*B64C 27/57* (2006.01)
*B64D 43/00* (2006.01)

(52) U.S. Cl.
CPC ............ *B64D 45/00* (2013.01); *B64C 27/57* (2013.01); *B64D 43/00* (2013.01)

(58) Field of Classification Search
CPC ........ B64D 43/00; B64D 45/00; B64C 27/57; B64C 19/00; B64C 27/04
USPC .................... 340/971, 946, 969; 701/3, 14
See application file for complete search history.

(56) References Cited

U.S. PATENT DOCUMENTS

| | | | |
|---|---|---|---|
| 6,195,598 B1 | 2/2001 | Bosqui et al. | |
| 6,411,869 B2 * | 6/2002 | Permanne | 701/14 |
| 8,295,997 B2 | 10/2012 | De Bono et al. | |
| 9,150,307 B2 * | 10/2015 | Eglin | B64C 27/57 |
| 9,216,820 B2 * | 12/2015 | Eglin | B64C 27/04 |
| 2009/0088922 A1 * | 4/2009 | Mesec | B64C 27/008 702/183 |
| 2010/0235019 A1 | 9/2010 | De Bono et al. | |
| 2010/0312421 A1 | 12/2010 | Eglin | |

FOREIGN PATENT DOCUMENTS

| | | |
|---|---|---|
| EP | 2402716 | 1/2012 |
| FR | 2756256 | 5/1998 |
| FR | 2943131 | 9/2010 |
| FR | 2946322 | 12/2010 |
| WO | 9742466 | 11/1997 |
| WO | 2006081334 A2 | 8/2006 |
| WO | 2006081334 A3 | 8/2006 |

OTHER PUBLICATIONS

French Search Report for FR 1302254, Completed by the French Patent Office on Aug. 6, 2014, 7 Pages.

* cited by examiner

*Primary Examiner* — John A Tweel, Jr.
(74) *Attorney, Agent, or Firm* — Brooks Kushman P.C.

(57) ABSTRACT

A flight instrument that displays the rotational speed of a main rotor of a rotary-wing aircraft, with the flight instrument including display means, a first indicator of a setpoint for the rotational speed of the main rotor, a second indicator of the first current value of the rotational speed of the main rotor, and third and fourth indicators of the limit values of the rotational speed. The setpoint for the rotational speed of the main rotor is variable and the first indicator is stationary on the display means, with the second, third and fourth indicators being movable in relation to the first indicator.

19 Claims, 2 Drawing Sheets

FLIGHT INSTRUMENT DISPLAYING A VARIABLE ROTATIONAL SPEED OF A MAIN ROTOR OF AN AIRCRAFT

BACKGROUND OF THE INVENTION (1) Field of the Invention

The present invention lies in the area of aircraft flight instruments. More specifically, the invention relates to a flight instrument that displays a variable rotational speed of a main rotor of a rotary-wing aircraft, and also relates to a flight instrument procedure for displaying such a speed.

(2) Description of Related Art

A rotary-wing aircraft usually includes at least one main rotor that is rotatively driven by a power plant on board the aircraft. Thus, the main rotor supports the aircraft and provides its propulsion. Such an aircraft may also include an anti-torque rear rotor, or, for example, one or two propellers.

In particular, such a rotary-wing aircraft is piloted through the monitoring of numerous instruments that represent the operation of the power plant and of the aircraft. In fact, numerous mechanical, physical, and aerodynamic limitations must be taken into consideration by the pilot while the aircraft is being flown.

In particular, one instrument indicates, in real time, the rotational speed of the main rotor of the aircraft. This rotational speed of the main rotor of the aircraft is often designated by the abbreviation "NR".

In particular, the main rotor provides the lift that is necessary in order to support the aircraft. This lift provided by the main rotor is directly linked to the rotational speed of this main rotor. Therefore, control of this rotational speed of the main rotor of the aircraft is essential in order to ensure this lift and, consequently, to ensure the flight of the aircraft.

In contemporary aircraft, the rotational speed of the main rotor is often essentially constant. However, this rotational speed may vary over a limited range above and below a constant value that constitutes a fixed setpoint for the rotational speed of the main rotor. This rotational speed may vary depending on flight conditions, such as the altitude of the aircraft or even the path followed by the aircraft.

For example, this limited range may represent up to 7% of this fixed setpoint, with the speeds that constitute variations of this rotational speed of the main rotor (that is, the acceleration or the deceleration of the main rotor in rotation) being on the order of 1% of this fixed setpoint per second. The term "range" is understood as referring to an interval of values that may be taken on by the rotational speed of the main rotor of the aircraft.

For example, for a rotational speed of the main rotor on the order of 300 revolutions per minute (300 rpm), the variation speed of this rotational speed is on the order of 3 revolutions per second (3 rpm/sec).

Thus, for this type of aircraft and in certain phases of flight, the control of this rotational speed of the main rotor is based on sound. In fact, the pilot typically knows, through habituation, the sound emitted by the main rotor when it is rotating at the fixed setpoint. Indeed, thanks to his experience, the pilot is capable of confirming by ear that this rotational speed of the main rotor is in fact constant and essentially compliant with the fixed setpoint.

The instrument that indicates this rotational speed of the main rotor makes it possible to control the value of this rotational speed of the main rotor of the aircraft, and is used essentially by the pilot during flight phases for which this rotational speed of the main rotor varies.

This instrument is also used during specific flight phases, such as during flight under autorotation or in the event of an engine failure during stationary flight.

In most aircraft this instrument is an analog instrument, and is graduated in terms of percentages of the fixed setpoint for the rotational speed of the main rotor, with this fixed setpoint corresponding to a graduation mark of "100%". This instrument also includes indications that correspond to fixed rotational speed limits that must not be exceeded. In fact, if these fixed limits are exceeded, damaging effects on the mechanical power-transmission train may occur, or a risk of engine flameout may arise, for example, due to excessively sudden deceleration.

In certain aircraft, this instrument may also indicate the rotational speed of the free turbine of each turboshaft engine that drives the main rotor. In fact, by means of their free turbine, these turboshaft engines drive the main power transmission gearbox, and, consequently, the main rotor. Indeed, there is a constant ratio of proportionality between the rotational speed of each free turbine and the rotational speed of the main rotor.

In recently manufactured aircraft this instrument has been replaced by a digital display that indicates, in numerals, the percentage of the fixed setpoint that constitutes the current value of the rotational speed of the main rotor. An analog instrument may still be present; however, in such a case it constitutes a back-up instrument in the event of a failure of the digital display.

Nevertheless, the rotational speed of the main rotor of a rotary-wing aircraft can be caused to vary voluntarily and continuously over an expanded range that may represent, for example, as much as 15 or 20% of an average rotational speed of this main rotor. Therefore, the setpoint that this rotational speed of the main rotor must maintain is no longer fixed, but instead is variable, and may change continuously within this expanded range during the flight of the aircraft.

Such variations in the rotational speed of the main rotor, which may occur with major speed variations, make it possible to obtain several improvements in the operation of the aircraft, including, in particular, a reduction in the noise generated by the main rotor, as well as an increase in the maneuverability of the aircraft and in its performance.

In the specific case of a hybrid aircraft that flies with a high forward speed, the rotational speed of the main rotor must be reduced in order to prevent excessive speed in relation to the air at the end of each blade of this main rotor and, in particular, to prevent the said speed from exceeding the speed of sound.

For example, the variation speed of the rotational speed of the main rotor is on the order of 5% of this rotational speed of the main rotor per second.

Conversely, because the setpoint for the rotational speed of the main rotor is variable, the rotational speed of the main rotor may be equal to each value within the expanded range, depending on the flight conditions.

Indeed, the pilot of the aircraft must make sure that this rotational speed of the main rotor always remains essentially equal to the variable setpoint—a task that requires his attention even when the flight status is normal.

Furthermore, the instrument that currently indicates this rotational speed of the main rotor does not provide effective assistance to the pilot, because the variable setpoint does not appear on this instrument. Obviously, this variable setpoint could be added to this instrument. However, because the setpoint can vary continuously, such an instrument would make heavy demands on the attention of the pilot of the aircraft in order to identify the variable setpoint for the current rotational speed of the main rotor.

Furthermore, because this rotational speed of the main rotor varies continuously, the sound emitted by the main rotor changes routinely during the course of the flight. Similarly, even if the pilot continues to monitor the rotational speed of the main rotor by ear, the pilot can no longer maintain accurate and effective sound-based control of this rotational speed of the main rotor (that is, control based on the frequency of the sound emitted by the rotor). Thus, the pilot requires an instrument that accurately indicates this rotational speed of the main rotor of the aircraft.

Consequently, the use of a variable setpoint for the rotational speed of the main rotor of an aircraft requires the use of an instrument that indicates to the pilot, in a clear and simple manner, both the variable setpoint and the current rotational speed of the main rotor. Furthermore, the use and the broader dissemination, in the near future, of such a variable setpoint may be confusing or disconcerting to pilots of rotary-wing aircraft, because it calls into question certain customary practices for flying such an aircraft in relation to its traditional use.

Thus, the presence of such an instrument should be included among the key stages of the acceptance of this variable setpoint by the pilots. Conversely, the use of inappropriate instruments may limit the range covered by the rotational speed of the main rotor and/or its dynamic operation, thereby limiting the improvements contributed by the use of this variable setpoint in terms of the operation of the aircraft per se.

Document FR2756256 is known, which describes a power-margin indicator for a rotary-wing aircraft. This indicator shows the current value of the collective pitch of the blades of the main rotor of the aircraft, as well as an available power margin that is represented in terms of a collective pitch margin. This power margin is calculated in terms of the technical limitations of the motors and of the main power transmission gearbox of this aircraft.

Furthermore, document WO97/42466 describes a variable parameter display whose background changes depending on the operating mode and/or the circumstances. The graduation marks are fixed, but the display of these graduations, as well as the color of the marks, may vary, particularly as a function of the circumstances. The parameter that is displayed may consist, for example, of the rotational speed of the main rotor of a rotary-wing aircraft.

Meanwhile, document EP2402716 describes a system that is capable of drawing the attention of the pilot of an aircraft to a particular indicator. For this purpose, the system may zoom in on a specific portion of this indicator, for example, when this indicator approaches a setpoint value or a limit value.

Document WO2006/081334 is also known, which describes a power indicator for a rotary-wing aircraft. In particular, this power indicator may provide information about the rotational speed of the main rotor of this aircraft. It displays, in columns on a graph, the setpoint for this rotational speed of the main rotor; the current value of this rotational speed of the main rotor; and minimum and maximum values for this rotational speed of the main rotor.

Moreover, document FR2943131 describes a flight indicator that shows, on a graduated moving scale, information about the current collective pitches, the limit values, and the target values for the main-rotor blades.

Last, document FR2946322 describes a flight instrument for a hybrid helicopter that makes it possible to display a maximum average pitch that is applicable to the propellers of this hybrid helicopter.

BRIEF SUMMARY OF THE INVENTION

Thus, the purpose of the present invention is to propose a flight instrument and a procedure that make it possible to meet the needs of the pilots of rotary-wing aircraft in terms of managing the variable setpoint for the rotational speed of the main rotor.

One goal of the present invention relates to a flight instrument that makes it possible to determine flight information and to ensure the visual conveyance of this information to the pilots of rotary-wing aircraft. More specifically, one of the goals of the present invention involves the task of displaying information about the rotational speed of the main rotor of a rotary-wing aircraft.

According to the invention, a flight instrument is intended for a rotary-wing aircraft. Such an aircraft is usually equipped with at least one main rotor; at least one motor, such as a turboshaft engine; and at least one set of means for determining atmospheric parameters and the flight parameters of the aircraft, including a first current value of a rotational speed of the main rotor. The flight instrument displays first pieces of information about this rotational speed of the main rotor, and includes:

display means,
at least one set of computation means enabling the determination of a setpoint for the rotational speed of the main rotor, along with a lower limit and at least one upper limit of the rotational speed of the main rotor,
a first indicator of the setpoint for this rotational speed of the main rotor,
a second indicator of the first current value of this rotational speed of the main rotor, and
a third indicator and a fourth indicator, corresponding respectively to at least one lower limit and at least one upper limit of this rotational speed of the said main rotor.

The term "current value" of a parameter is understood as referring to the value of this parameter in real time.

The aircraft includes at least one set of means for determining atmospheric parameters and the flight parameters of the aircraft that are useful, in particular, in terms of the operation and piloting of this aircraft. These atmospheric parameters include, for example, the atmospheric pressure and the temperature outside the aircraft, and the flight parameters may consist of the forward speed of the aircraft, its altitude, the rotational speed of the main rotor, or even the operating parameters of each motor.

This flight instrument according to the invention may be located on the instrument panel of the aircraft, in order to indicate these first pieces of information about the rotational speed of the main rotor to the pilot.

This flight instrument is notable in that either the first indicator or the second indicator is represented in a fixed manner on the display means, while the other indicator is represented movably, with the third and fourth indicators being represented movably.

The first indicator is preferably represented in a fixed manner on the display means, regardless of the value of this setpoint. The value of the setpoint may be a constant, or else may be variable. In fact, the setpoint for this rotational speed of the main rotor, which is traditionally fixed, may be variable, particularly in order to improve the performance of the aircraft and to reduce these noise nuisances. This setpoint for the rotational speed of the main rotor may vary, in particular, depending on atmospheric parameters and on the flight parameters of the aircraft, such as, for example, the forward speed of the aircraft and/or its flight phase.

The second indicator is then represented movably and is shifted as a function of the first current value of this rotational speed of the main rotor, as shown on the display means, in relation to the first indicator.

Accordingly, this flight instrument makes it possible to indicate, clearly and continuously, the difference between the setpoint and the first current value of this rotational speed of the main rotor, with this difference being represented by the space between the first indicator and the second indicator. Indeed, when the first current value is equal to the setpoint, the first and second indicators coincide.

The first indicator is preferably centered on the display means, with the shape of these display means being, for example, circular. The first indicator and the second indicator may take the shape of a needle that passes through the center of the circular shape of these display means. In such a case, the second indicator moves rotatively about this center.

These display means may also take the shape of a scrolling or drop-down column, or of a moving band or ribbon, with the first indicator being located at the center of the scrolling or drop-down column, or of the moving band or ribbon, and with the second indicator shifting its position in a rectilinear manner.

Furthermore, this rotational speed of the main rotor includes at least one lower limit and at least one upper limit, which are represented respectively by the third and fourth indicators.

The lower and upper limits may be fixed, while the value of the setpoint is a variable value. In such a case, the third indicator and the fourth indicator are shifted on the display means in relation to the first indicator as soon as the setpoint varies.

Nevertheless, each lower and upper limit may also be variable, regardless of whether the value of the setpoint is a constant value or a variable value. The third indicator and the fourth indicator may then be shifted on the display means in relation to the first indicator when the values of each lower and/or upper limit vary, as well as when the value of the setpoint varies.

These lower and upper limits are, for example, variable following the failure of a motor, in the case of a twin-engine aircraft, particularly with the lower limit being capable of being increased in order to approach an optimal rotational speed of the main rotor.

Similarly, among other things, the upper limit makes it possible to prevent excessive speed in relation to the air at the end of each blade of this main rotor and, in particular, to prevent the said speed from exceeding the speed of sound. Now, the speed of sound may vary substantially depending on atmospheric conditions, and particularly depending on the temperature. Indeed, this upper limit may vary depending on atmospheric conditions—for example, when the temperature outside the aircraft varies.

The third and fourth indicators may take the shape of markings on the display means. For example, when the shape of the display means is circular, the third and fourth indicators take the shape of markings consisting of arcs of a circle. Similarly, when the display means take the shape of a scrolling or drop-down column, or of a moving band or ribbon, the third and fourth indicators take the shape of linear markings.

Furthermore, each lower or upper limit may include multiple zones: for example, at least one first zone to be avoided and at least one prohibited second zone.

Advantageously, this flight instrument according to the invention makes it possible to limit the amount of information provided to the pilot of the aircraft. In fact, even though the setpoint is variable, it appears in a fixed manner in the form of the first indicator on the display means of this flight instrument. Subsequently, the pilot is not distracted by this variable setpoint, and can concentrate on the difference between the first current value and the setpoint.

Moreover, these lower and upper limits are displayed on the display means in the form of the third and fourth indicators, depending on the value of the setpoint. Thus, on this flight instrument, the pilot of the aircraft can continuously see these lower and upper limits in relation to the setpoint and in relation to the first current value of this rotational speed of the main rotor. Accordingly, this flight instrument makes it possible effectively to recover from the approach to either of these limits by the setpoint and/or by the first current value of this rotational speed of the main rotor.

Conversely, unlike the instruments traditionally used in aircraft, the display means of the flight instrument according to the invention do not include graduation marks. Indeed, the pilot does not know the exact first current value of this rotational speed of the main rotor based on the second indicator. Instead, the pilot knows only the position of this value in relation to the setpoint and in relation to the lower and upper limits.

Nevertheless, the flight instrument according to the invention may include a digital indication, in order to display with exactitude this first value of the rotational speed of the main rotor.

For example, the flight instrument according to the invention displays this first current value of the rotational speed of the main rotor as a percentage of an average value of this rotational speed over the expanded range of variation of this rotational speed.

Nevertheless, the main rotor of an aircraft may include a particular operational point, to which a particular value of the rotational speed of the main rotor corresponds. Conversely, this particular value of the rotational speed of the main rotor is not always located at the center of the expanded range of variation of this rotational speed. In such a case, the flight instrument according to the invention preferably displays this first current value of the rotational speed of the main rotor as a percentage of this particular value of the rotational speed of the main rotor.

Furthermore, each lower or upper limit may include multiple zones: for example, two first zones to be avoided and two prohibited second zones. In the prohibited zone corresponding to the upper limit, the rotational speed may be too high, thereby posing the risk of damaging the turboshaft engines and/or the main power transmission gearbox. Conversely, in the prohibited zone corresponding to the lower limit, the rotational speed may be insufficient to ensure, for example, the safety of the aircraft. The zones to be avoided may consist, for example, of safety margins pertaining to the prohibited zones.

Nevertheless, as mentioned earlier, the use of such a variable setpoint for the rotational speed of the main rotor may be confusing or disconcerting to pilots of rotary-wing aircraft, because it calls into question certain customary flight practices relating to the traditional use of such an aircraft. Furthermore, this rotational speed of the main rotor is often monitored by ear, with the pilot knowing, through habituation, the sound emitted by the main rotor when it is rotating at a fixed setpoint.

Because this rotational speed may be variable, this sound-based control of the rotational speed of the main rotor is no longer either effective or reliable. Therefore, the pilot must routinely use an instrument that indicates, in particular, this rotational speed of the main rotor and its setpoint.

Advantageously, the flight instrument according to the invention enables a clear display of the variable setpoint and of the first current value of this rotational speed of the main rotor. In fact, because the first indicator represents the variable setpoint in a fixed manner, the pilot's attention is not monopolized by this variable setpoint, and the pilot can focus part of his attention primarily on the difference between the setpoint for the rotational speed of the main rotor and the first current value of this rotational speed.

Indeed, this flight instrument makes it possible to limit the density of the information provided to the pilot, which information density is already substantial on board the latest generation of rotary-wing aircraft. Furthermore, when the first current value of this rotational speed of the main rotor is equal to the setpoint, the first and second indicators coincide, with this flight instrument thus reproducing a pattern that is well known to aircraft pilots.

Moreover, in order to facilitate the pilot's awareness of this difference between the first current value of this rotational speed of the main rotor and the setpoint, the flight instrument according to the invention includes a transition zone that consists of filling, with a specific color, the space separating the first indicator and the second indicator, with the transition zone representing this difference. The flight instrument according to the invention uses calculation means that it includes in order to determine the amplitude of this difference and to display the corresponding transition zone with the specific color.

By showing the difference between the first current value of this rotational speed of the main rotor and the setpoint, this transition zone makes it possible to attract the pilot's attention. Therefore, the pilot does not in fact need to continuously observe the flight instrument according to the invention. The pilot should use this flight instrument above all when a difference exists between the first current value of this rotational speed of the main rotor and the setpoint—that is, when the transition zone is visible. In particular, this makes it possible to limit the density of the information provided to the pilot of the aircraft.

Advantageously, this transition zone may be shown in different colors, depending on the amplitude of this difference between the first current value of this rotational speed of the main rotor and its setpoint, and also depending on a transitory period that is used to cause the first current value to move toward the setpoint. The transitory period may, for example, consist of the period during which the amplitude of this difference is greater than a given difference threshold, with the transitory period being determined by the computation means and with the difference threshold being predetermined.

For example, the color of the transition zone may be green when the amplitude of the difference between the first current value of this rotational speed of the main rotor and the setpoint is less than 1% of the setpoint value. The color of this transition zone is orange when the amplitude of this difference is between 1 and 3% of the setpoint value, and red when the amplitude of this difference is greater than 3% of the setpoint value.

Moreover, the amplitude of this difference and the transitory period do not have the same effects on the color of the transition zone depending on whether the setpoint is or is not in the process of varying.

For example, when the setpoint varies, this difference may be substantial, and should be rapidly reduced so that the first current value of the rotational speed of the main rotor approaches its setpoint. In such a case, the color of the transition zone may, for example, be orange, to indicate to the user that he must act on the first current value of the rotational speed of the main rotor.

If this difference does not diminish during the transitory period while the setpoint no longer varies, the color of the transition zone may turn red, to draw the user's attention to this difference. For example, the duration of this transitory period may be on the order of several seconds.

Conversely, if this difference diminishes rapidly, with the first current value becoming very close to the setpoint, then the color of this transition zone may turn green, indicating to the user that he has maneuvered properly and at the correct speed, in order to rapidly reach the setpoint.

The computation means of the flight instrument according to the invention make it possible to determine the color of the transition zone in accordance with one or more predefined algorithms. These algorithms use, for example, the amplitude of the difference between the first current value and the setpoint, as well as the transitory period and the difference threshold.

Similarly, the third and fourth indicators may be of different colors, in order to alert the pilot when the first current value of this rotational speed of the main rotor approaches its lower limit or its upper limit.

The present invention also relates to a rotary-wing aircraft that includes at least one main rotor, at least one turboshaft engine, a main power transmission gearbox, at least one set of means for determining atmospheric parameters and the flight parameters of the aircraft, and an instrument panel equipped with various instruments, including at least one flight instrument as described hereinabove. Each turboshaft engine includes a free turbine that rotatively drives the main rotor, doing so by means of the main power transmission gearbox.

Furthermore, the flight instrument of this aircraft may also include at least one fifth indicator of a second current value of the rotational speed of the free turbine of each turboshaft engine.

In fact, each free turbine drives the main rotor, doing so by means of the main power transmission gearbox. Indeed, there is an essentially constant ratio of proportionality between the rotational speed of the free turbine and the rotational speed of the main rotor. Consequently, it is possible to indicate, on the flight instrument of the aircraft, a second current value of the rotational speed of the free turbine of each turboshaft engine, doing so by means of the fifth indicator. This fifth indicator is oriented in parallel with the second indicator. The first indicator then corresponds, on the one hand, to a setpoint for the rotational speed of the main rotor and, on the other hand, to a setpoint for the rotational speed of the free turbine.

Furthermore, supplemental sixth and seventh indicators may be added to the flight instrument according to the invention in order to represent the lower and upper limits of this rotational speed of the free turbine of each turboshaft engine.

When this aircraft has a single turboshaft engine, the flight instrument includes a fifth indicator of a second current value of the rotational speed of the free turbine of this turboshaft engine. Conversely, when this aircraft has two turboshaft engines, the flight instrument includes two fifth indicators, with each fifth indicator representing the second current value of the rotational speed of the free turbine of each corresponding turboshaft engine.

Furthermore, the display logic of the flight instrument according to the invention may be reversed, particularly in accordance with the pilot's requirements.

In such a case, the second indicator is represented in a fixed manner on the display means, with the first indicator being represented movably in relation to the second indicator. The third and fourth indicators are represented movably on the display means.

Accordingly, the current value of the rotational speed of the main rotor is represented in a fixed manner. In such a case, the setpoint is represented movably on the flight instrument, in the same way as the lower and upper limits of the rotational speed of the main rotor.

The present invention also relates to a flight instrument procedure for a rotary-wing aircraft. Such a flight instrument procedure displays first pieces of information about the rotational speed of a main rotor of a rotary-wing aircraft. During this flight instrument procedure:

Atmospheric parameters and the flight parameters of the aircraft are determined, including the first current value of a rotational speed of its main rotor, A setpoint is calculated for the rotational speed of the main rotor, along with at least one lower limit and at least one upper limit of the rotational speed of the main rotor, The setpoint for the rotational speed of the main rotor is displayed on display means, The first current value of the rotational speed of the main rotor is displayed on the display means, and At least one lower limit and at least one upper limit of this rotational speed of the main rotor are displayed movably on the display means.

The setpoint for the rotational speed of the main rotor is preferably represented in a fixed manner on the display means, and the first current value of the rotational speed of the main rotor is preferably represented movably.

Nevertheless, the first current value of the rotational speed of the main rotor may also be represented in a fixed manner on the display means, and the setpoint for the rotational speed of the main rotor may be represented movably.

Furthermore, during this flight instrument procedure, a difference may be determined between the first current value of the rotational speed of the main rotor and its setpoint, and this difference may be displayed on the display means in the form of a transition zone.

A transitory period may also be determined during which this difference is greater than a difference threshold between the first current value of the rotational speed of the main rotor and its setpoint, with this difference then being displayed using a specific color, depending on the amplitude of this difference and/or depending on the transitory period.

Moreover, an aircraft generally includes at least one main rotor, at least one turboshaft engine, and a main power transmission gearbox, with each turboshaft engine including a free turbine that rotatively drives the main rotor, doing so by means of the main power transmission gearbox.

A second current value of the rotational speed of the free turbine of each turboshaft engine may also be displayed on the display means, in which case the setpoint for this rotational speed of the free turbine of each turboshaft engine coincides with the setpoint for the rotational speed of the main rotor on the display means.

BRIEF DESCRIPTION OF THE SEVERAL VIEWS OF THE DRAWINGS

The invention and its advantages will become clear in greater detail within the scope of the following description, which includes examples of embodiments provided for illustrative purposes, with reference to the attached figures, among which.

Elements that appear in two or more different figures are indicated by the same reference number.

DETAILED DESCRIPTION OF THE INVENTION

Figure 1:
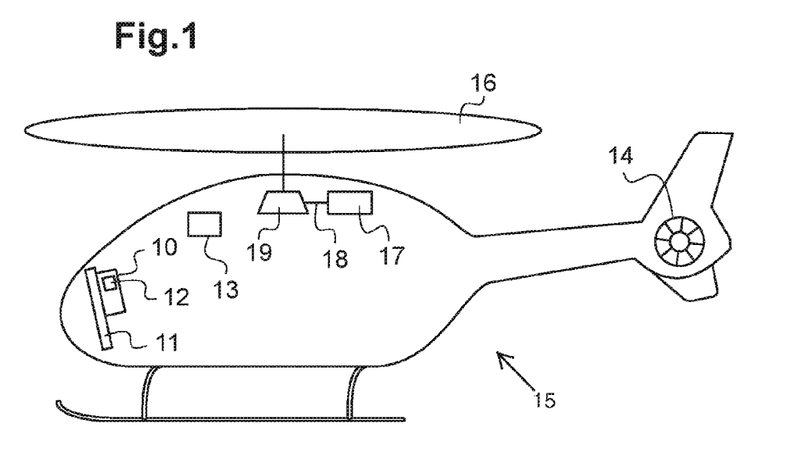
FIG. 1 shows a rotary-wing aircraft that includes at least one flight instrument according to the invention.

According to FIG. 1, a rotary-wing aircraft 15 includes a main rotor 16, a rear rotor 14, a turboshaft engine 17, and a main power transmission gearbox 19. The turboshaft engine 17 includes a free turbine 18 that rotatively drives the main rotor 16, as well as the rear rotor 14, doing so by means of the main power transmission gearbox 19. Furthermore, the aircraft 15 includes means 13 for determining atmospheric parameters and the flight parameters of the aircraft 15 that are useful in terms of the operation and piloting of this aircraft 15.

Figure 3:
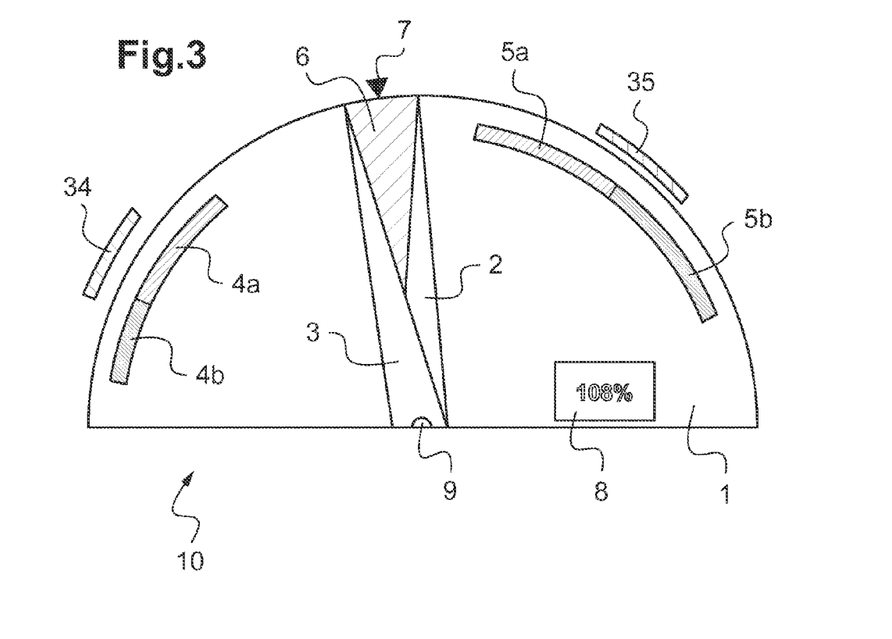
FIGS. 3 and 4 show an embodiment of the flight instrument according to the invention.
Figure 4:
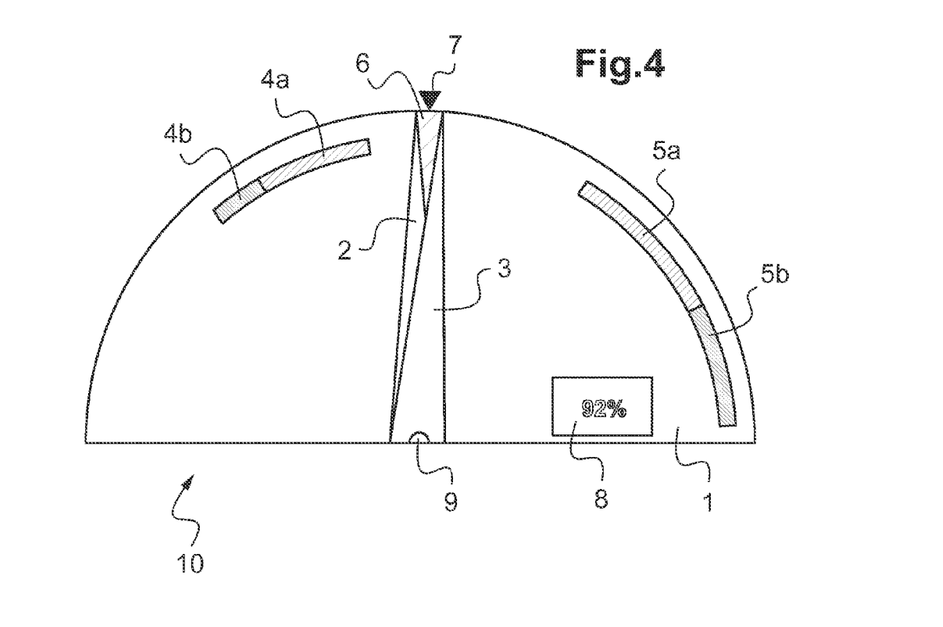

The aircraft 15 also includes an instrument panel 11 equipped with various instruments, including a flight instrument 10 that displays first pieces of information about the rotational speed of the main rotor 16 and second pieces of information about the rotational speed of the free turbine 18 of the turboshaft engine 17. This flight instrument 10 also includes computation means 12, and is shown in FIGS. 3 and 4.

Figure 2:
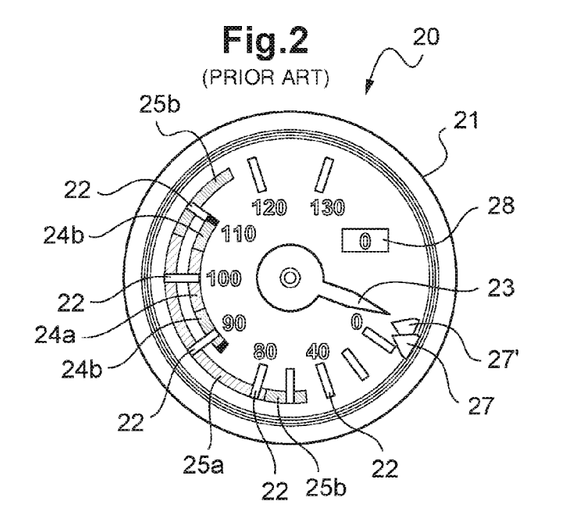
FIG. 2 shows a flight instrument traditionally used in an aircraft.

FIG. 2 shows a flight instrument 20 that is traditionally used in a rotary-wing aircraft to inform the pilot by displaying the rotational speed of the main rotor and the rotational speed of the free turbine of two turboshaft engines. This flight instrument 20 includes circular display means 21 equipped with graduation marks 22 and colored zones 24,25 consisting of arcs of a circle, as well as a needle 23 indicating a first current value of the rotational speed of the main rotor and two markers 27,27' indicating a second current value of the rotational speed of the free turbine of each turboshaft engine.

The graduation marks 22 correspond to two percent of the rotational speeds, with the "100%" mark corresponding, on the one hand, to a fixed setpoint for the rotational speed of the main rotor and, on the other hand, to a setpoint for the rotational speed of the free turbine of the two turboshaft engines.

The colored zones 24,25 correspond respectively to ranges for the use of the main rotor and of the free turbine of the two turboshaft engines. The central zones 24a,25a correspond to normal operating ranges, and may, for example, be green. The zones 24b,25b correspond to limit operating ranges, which are possible but which should be avoided, and whose color may be orange.

Accordingly, the needle 23 and the two markers 27,27' continuously indicate, respectively and in real time, the percentage of the current values of the rotational speeds of a main rotor and of the free turbine of each turboshaft engine in relation to the corresponding setpoints.

Furthermore, a digital indicator 28 also indicates the value of this percentage of the rotational speed of the main rotor in relation to the corresponding setpoint. This flight instrument 20 is perfectly suitable when these setpoints for rotational speeds are constant, which is the case with most of the aircraft that are currently in use.

Nevertheless, it is worthwhile for the setpoint for the rotational speed of a main rotor of an aircraft to be variable within an expanded range consisting, for example, of 15 to 20%, in order, on the one hand, to improve the maneuverability in the performance of the aircraft and, on the other hand, to reduce its noise nuisances. In such a case, the flight instrument 20 is not suitable, because it cannot tell the pilot about these variable setpoints. It may be possible to add one or more supplemental indicators corresponding to each setpoint, but in such a case this flight instrument 20 would become difficult to use by a pilot who must simultaneously monitor the change in the setpoints and the change in the rotational speeds, in addition to the multitude of other information that must also be monitored during a flight.

The flight instrument 10 shown in FIGS. 3 and 4 makes it possible to display clearly such a variable setpoint for the rotational speed of the main rotor 16 of an aircraft 15, as well as the rotational speed of the main rotor 16, the rotational speed of the free turbine 18 of the turboshaft engine 17, and the lower and upper limits of these rotational speeds.

The flight instrument 10 includes semi-circular display means 1 and several indicators 2,3,4,5,7,34,35. The center 9 of the circle forming the outline of these semi-circular display means 1 is shown in FIGS. 3 and 4.

The first indicator 2 is shown in a fixed manner on display means 1, and corresponds to the variable setpoint for the rotational speed of the main rotor 16. This first indicator 2 is a needle that is oriented vertically in the middle of the display means 1, passing through the center 9.

The second indicator 3 corresponds to the first current value of the rotational speed of the main rotor 16. This current value of the rotational speed of the main rotor 16 may vary, depending on the duration of its presence. Indeed, this second indicator 3 is movable on the display means 1. This second indicator 3 is a needle that is located at the center 9 of the semi-circular display means 1 and that can rotate about this center 9.

The third and fourth indicators 4,5 correspond to the lower and upper limits of the rotational speed of the main rotor 16. These lower and upper limits may be fixed or variable. Consequently, these third and fourth indicators 4,5 are movable on the display means 1. These third and fourth indicators 4,5 consist of markings in the form of arcs of a circle that are located on the periphery of the display means 1. These arcs of a circle are centered on the center 9 and can rotate about the center 9.

Furthermore, the third and fourth indicators 4,5 include multiple zones, consisting of two first zones to be avoided 4a,5a and two prohibited second zones 4b,5b. In the second prohibited zone 5b, which corresponds to the upper limit, the rotational speed of the main rotor 16 may be too high, thereby posing the risk of damaging the turboshaft engine 17 and/or the main power transmission gearbox 19. Conversely, in the prohibited zone 4b, which corresponds to the lower limit, this rotational speed may be insufficient to ensure, for example, the safety of the aircraft 15. The zones to be avoided 4a,5a may consist, for example, of safety margins pertaining to the prohibited zones 4b,5b.

A fifth indicator 7 corresponds to the second current value of the rotational speed of the free turbine 18, and is movable on the display means 1. This fifth indicator 7 is a marker that is located at the periphery of the display means 1, outside the third and fourth indicators 4,5, and can rotate about the center 9.

The sixth and seventh indicators 34,35 correspond to the lower and upper limits of the rotational speed of the free turbine 18, which limits may be fixed or variable. Consequently, these sixth and seventh indicators 34,35 are movable on the display means 1. Like the fourth and fifth indicators 4,5, these sixth and seventh indicators 34,35 consist of markings in the form of arcs of a circle that are located on the periphery of the display means 1, centered on the center 9, and capable of rotating about this center 9.

The flight instrument 10 also includes a transition zone 6 that is located between the first indicator 2 and the second indicator 3. This transition zone 6 corresponds to the difference between the first current value of the rotational speed of the main rotor 16 and its setpoint. The computation means 12 make it possible, in particular, to determine the amplitude of this difference and to display the corresponding transition zone 6 using a specific color.

Last, the flight instrument 10 includes a digital indicator 8 that displays the first current value of the rotational speed of the main rotor 16, which first current value is a percentage of a specific value of this rotational speed of the main rotor 16. This specific value of the rotational speed of the main rotor 16 actually corresponds to a particular operational point of the main rotor 16 of the aircraft 15.

In FIG. 3, which represents a first example of the display, the first indicator 2 is near the zone to be avoided 5a of the upper limit of the rotational speed of the main rotor 16. Moreover, the digital indicator 8 displays a rotational value corresponding to 108% of the specific value of the rotational speed of the main rotor 16. The second indicator 3 is located to the left of the first indicator 2, signifying that the first current value of the rotational speed of the main rotor 16 of the aircraft 15 is lower than its setpoint.

Furthermore, the transition zone 6 is relatively large, with the second indicator 3 being located fairly far from the first indicator 2. In this first example, the color of this transition zone 6 may be red, in order to tell the pilot to act so that this first current value of the rotational speed of the main rotor 16 of the aircraft 15 can be increased rapidly in order to approach the setpoint. The flight instrument 10 also indicates that the second current value of the rotational speed of the free turbine 18 is lower than its setpoint, with the fifth indicator 7 being to the left of the first indicator 2.

Operationally, this first example may correspond to an entry into a stationary flight phase of the aircraft 15.

In FIG. 4, which represents a second example of the display, the first indicator 2 is near the zone to be avoided 4a of the lower limit of the rotational speed of the main rotor 16. Moreover, the digital indicator 8 displays a rotational value corresponding to 92% of the specific value of the rotational speed of the main rotor 16. The second indicator 3 is located to the right of the first indicator 2, signifying that the first current value of the rotational speed of the main rotor 16 of the aircraft 15 is higher than its setpoint.

Furthermore, the transition zone 6 is relatively small, with the second indicator 3 being located near the first indicator 2. In this second example, the color of this transition zone may be green, in order to indicate to the pilot that the situation does not present any risks. However, the pilot may act so that the first current value of the rotational speed of the main rotor 16 moves closer to the setpoint. The flight instrument 10 also indicates that the second current value of the rotational speed of the free turbine 18 is very slightly higher than its setpoint, with the fifth indicator 7 being to the right of the first indicator 2.

Operationally, this second example may correspond to a descending flight phase of the aircraft 15.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A flight instrument intended for a rotary-wing aircraft equipped with at least one main rotor, at least one motor, and at least one set of means for determining atmospheric parameters and flight parameters of the aircraft, including a first current value consisting of a rotational speed of the main rotor, with the flight instrument displaying first information about the rotational speed of the main rotor and including:
  display means;
    at least one set of computation means enabling the determination of a variable setpoint for the rotational speed of the main rotor, along with at least one lower limit and at least one upper limit of the rotational speed of the main rotor;
    a first indicator of the variable setpoint for the rotational speed of the main rotor;
    a second indicator of the first current value of the rotational speed of the main rotor; and
    a third indicator and a fourth indicator, corresponding respectively to at least one lower limit and at least one upper limit of the rotational speed of the main rotor;
    wherein either the first indicator or the second indicator is represented in a fixed manner on the display means, while the other one of the first indicator and the second indicator is represented movably on the display means, with the third and fourth indicators being represented movably on the display means.

2. The flight instrument according to claim 1, wherein the first indicator is represented in a fixed manner on the display means, while the second indicator is represented movably in relation to the first indicator.

3. The flight instrument according to claim 1, wherein the second indicator is represented in a fixed manner on the display means, while the first indicator is represented movably in relation to the second indicator.

4. The flight instrument according to claim 1, wherein the flight instrument includes a transition zone located between the first indicator and the second indicator, with the computation means determining a difference between the first current value and the variable setpoint for the rotational speed of the main rotor, with the transition zone representing the difference.

5. The flight instrument according to claim 4, wherein the transition zone has a specific color depending on an amplitude of the difference and/or depending on a transitory period during which the difference is greater than a threshold value of the difference, with the transitory period being determined by the computation means.

6. The flight instrument according to claim 1, wherein the aircraft includes at least one turboshaft engine and a main power transmission gearbox; each turboshaft engine including a free turbine that rotatively drives the main rotor by means of the main power transmission gearbox; and the flight parameters including a second current value of the rotational speed of the free turbine of each turboshaft engine, the flight instrument displaying second information about the rotational speed of the free turbine of each turboshaft engine, and including at least one fifth indicator of the second current value of the rotational speed of the free turbine of each turboshaft engine.

7. The flight instrument according to claim 1, wherein the first indicator is located at a center of the display means.

8. The flight instrument according to claim 1, wherein the display means are circular in shape.

9. A rotary-wing aircraft including a main rotor, at least one turboshaft engine, a main power transmission gearbox, and at least one flight instrument, with each turboshaft engine including a free turbine that rotatively drives the main rotor by means of the main power transmission gearbox, wherein the flight instrument is according to claim 1.

10. A flight instrument procedure that displays first pieces of information about a rotational speed of a main rotor of a rotary-wing aircraft equipped with at least one main rotor and at least one motor, during which procedure:
  atmospheric parameters and flight parameters of the aircraft are determined, including a first current value of the rotational speed of the main rotor;
  a variable setpoint is calculated for the rotational speed of the main rotor, along with at least one lower limit and at least one upper limit of the rotational speed of the main rotor;
  the variable setpoint for the rotational speed of the main rotor is displayed via display means;
  the first current value of the rotational speed of the main rotor is displayed on the display means, with one of the variable setpoint for the rotational speed of the main rotor and the first current value of the rotational speed of the main rotor being represented in a fixed manner on the display means and the other one of the variable setpoint for the rotational speed of the main rotor and the first current value of the rotational speed of the main rotor being represented in a movable manner on the display means; and
  the at least one lower limit and at least one upper limit of the rotational speed of the main rotor are displayed movably on the display means.

11. The flight instrument procedure according to claim 10, wherein the variable setpoint for the rotational speed of the main rotor is represented in a fixed manner on the display means, and the first current value of the rotational speed of the main rotor is represented in a movable manner on the display means.

12. The flight instrument procedure according to claim 10, wherein the first current value of the rotational speed of the main rotor is represented in a fixed manner on the display means, and the variable setpoint for the rotational speed of the main rotor is represented in a movable manner on the display means.

13. The flight instrument procedure according to claim 10, wherein a difference is determined between the first current value and the variable setpoint for the rotational speed of the main rotor, and the difference is displayed on the display means.

14. The flight instrument procedure according to claim 13, wherein a transitory period is determined during which the difference is greater than a threshold value of the difference between the first current value and the variable setpoint for the rotational speed of the main rotor, and the difference is displayed using a color that depends on the amplitude of the difference and/or depending on the transitory period.

15. The flight instrument procedure according to claim 10, wherein with the aircraft including at least one main rotor, at least one turboshaft engine, and one main power transmission gearbox, with each turboshaft engine including a free turbine that rotatively drives the main rotor by means of the main power transmission gearbox, at least one second current value of the rotational speed of the free turbine of each turboshaft engine is displayed.

16. A flight instrument for a rotary-wing aircraft having a main rotor, the flight instrument comprising:
  a display having a first indicator of a current value of a variable setpoint for a rotational speed of the main rotor and a second indicator of a current value of the rotational speed of the main rotor; and
  wherein one of the indicators is a fixed indicator that is fixed on the display and the other one of the indicators is a movable indicator that is movable on the display relative to the fixed indicator in correspondence with variation of the current value of the movable indicator and the current value of the fixed indicator relative to one another.

17. The flight instrument of claim 16 wherein:
the first indicator is the fixed indicator and is fixed on the display regardless of variation of the current value of the variable setpoint, and the second indicator is the movable indicator.

18. The flight instrument of claim 16 wherein:
the first indicator is the movable indicator, and the second indicator is the fixed indicator and is fixed on the display regardless of variation of the current value of the rotational speed of the main rotor.

19. The flight instrument of claim 16 wherein:
the display further includes a third indicator of a lower limit of the rotational speed of the main rotor and a fourth indicator of an upper limit of the rotational speed of the main rotor, and the third and fourth indicators are movable on the display.

\* \* \* \* \*